United States Patent [19]

Miley

[11] Patent Number: 5,527,499
[45] Date of Patent: Jun. 18, 1996

[54] EXTRUSION APPARATUS AND METHOD WITH PRESSURE EQUALIZATION

[75] Inventor: Gary D. Miley, Stow, Ohio

[73] Assignee: Bridgestone/Firestone, Inc., Akron, Ohio

[21] Appl. No.: 382,225

[22] Filed: Jan. 31, 1995

[51] Int. Cl.$^6$ .................................................. B29C 47/92
[52] U.S. Cl. ................. 264/40.1; 264/40.7; 264/173.12; 264/177.19; 425/131.1; 425/145; 425/197; 425/382.4; 425/462
[58] Field of Search ................................ 264/40.7, 40.1, 264/177.16, 177.17–177.19, 173.12; 425/145, 133.5, 131.1, 462, 382.4, 197

[56] References Cited

U.S. PATENT DOCUMENTS

| | | | |
|---|---|---|---|
| 2,566,854 | 9/1951 | Rhodes | 264/40.7 |
| 3,863,001 | 1/1975 | Thumudo, Jr. | 264/148 |
| 4,075,265 | 2/1978 | McClung et al. | 264/53 |
| 4,097,566 | 6/1978 | Bertin et al. | 264/40.7 |
| 4,410,477 | 10/1983 | Claude . | |
| 4,416,605 | 11/1983 | Kondo et al. . | |
| 4,515,738 | 5/1985 | Anders . | |
| 4,680,152 | 7/1987 | Capelle | 264/40.7 |
| 4,693,855 | 9/1987 | Herbert | 264/40.7 |
| 4,719,071 | 1/1988 | Capelle . | |
| 4,728,279 | 3/1988 | Bellmer | 425/197 |
| 4,754,413 | 6/1988 | Köster et al. | 264/40.7 |
| 4,832,882 | 5/1989 | Moylan . | |
| 4,892,473 | 1/1990 | Elia et al. | 425/382.4 |
| 4,944,903 | 7/1990 | Nilsson . | |
| 5,071,604 | 12/1991 | Tsujikura et al. . | |
| 5,128,077 | 7/1992 | Stevenson et al. | 264/211.23 |
| 5,147,195 | 9/1992 | Cloeren | 425/131.1 |

*Primary Examiner*—Jeffery R. Thurlow
*Attorney, Agent, or Firm*—Carmen Santa Maria

[57] ABSTRACT

An extrusion apparatus and method for producing a composite profile strip characterized by an extrusion head having plural flow channels extending to an extrusion die and at least two extruders for feeding respective components at respective different pressures into the flow channels for passage to the extrusion die. The extrusion die has a common die outlet from which the components are discharged to form the composite profile strip, and respective flow restriction devices are disposed in the flow channels between the extruders and the extrusion die. The flow restriction devices are operative to decrease the difference in pressure between the components before being brought together at the extrusion the extrusion die and further to dampen the effect changes in extruder speed has on the profile of the composite profile strip.

19 Claims, 1 Drawing Sheet

EXTRUSION APPARATUS AND METHOD WITH PRESSURE EQUALIZATION

BACKGROUND

The invention herein described relates generally to the extrusion of composite profile strips and, more particularly, to the extrusion of a multilayer tread strip for use in the manufacture of a vehicle tire.

Composite profile strips heretofore have been extruded by extrusion apparatus wherein two or more extruders disposed adjacent one another feed respective components (such as rubber or plastic compounds) along respective flow channels in an extrusion head to a die. Flow channels in the head lead to a shaping insert and thereafter to a die wherein the different components are combined for discharge through a common die outlet to form a composite profile strip.

When extruding compounds such as rubber, the rubber is compressed as it is conveyed to the die and then it swells upon exiting the die to atmospheric pressure. This phenomena is referred to as die swell. In a typical system for extruding a composite profile tread strip for use in the manufacture of a vehicle tire, the extruders typically operate at differing throughput capacities and at different pressures for conveying through the extrusion head the rubber compounds which typically have different viscosities. As a result, the rubber compounds may swell at different rates. Also, a higher pressure component may overpower, i.e., swell into, a lower pressure component as they pass through and out of the extrusion die.

In the past, the shaping inserts and dies were designed to compensate for the die swell problem. This was a time consuming and complex procedure. Moreover, the die design would be optimized for a single extrusion rate at which the extrusion apparatus was intended to operate. Accordingly, these prior extrusion systems did not lend themselves to variable extrusion rates as may be desired in various applications.

SUMMARY OF THE INVENTION

The present invention overcomes or reduces the aforesaid problems associated with die swell by the provision of flow restriction devices in the flow channels of the extrusion head. The flow restriction devices are selected such that the difference in pressures of the components is reduced before passage to the extrusion die. Another benefit is that the flow restriction devices function to dampen the effect of speed changes on the profile of the composite strip, thereby effectively enabling variable extrusion rates as may be desired in various applications.

According to one aspect of the invention, an extrusion apparatus and method for producing a composite profile strip are characterized by an extrusion head having plural flow channels extending to an extrusion die and at least two extruders for feeding respective components at respective different pressures into the flow channels for passage to the extrusion die. The extrusion die has a common die outlet from which the components are discharged to form the composite profile strip, and respective flow restriction devices are disposed in the flow channels between the extruders and the extrusion die. The flow restriction devices operate to decrease the difference in pressure between the components (and, if desired, equalize the pressures) before being brought together at the extrusion die.

In a preferred embodiment, the flow restriction devices are removably disposed in the flow channels and each include a foraminous member which may include, for example, a screen and/or a perforated plate, such as a breaker plate which may back the screen. Pressure sensors may be associated with the flow channels to sense the pressures of the components downstream of the flow restriction devices, and a controller may be provided to control the speeds of the extruders in response to outputs of the pressure sensors. The speed of the extruders may be varied to change the speed at which the composite profile strip is discharged from the extrusion die, while the respective flow restriction devices in the flow channels function to dampen the effect the extruder speed change has on the profile of the composite profile strip. The selecting procedure may involve selecting a screen mesh size for each flow restriction device to provide a pressure drop greater for the higher pressure feed than the lower pressure feed.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
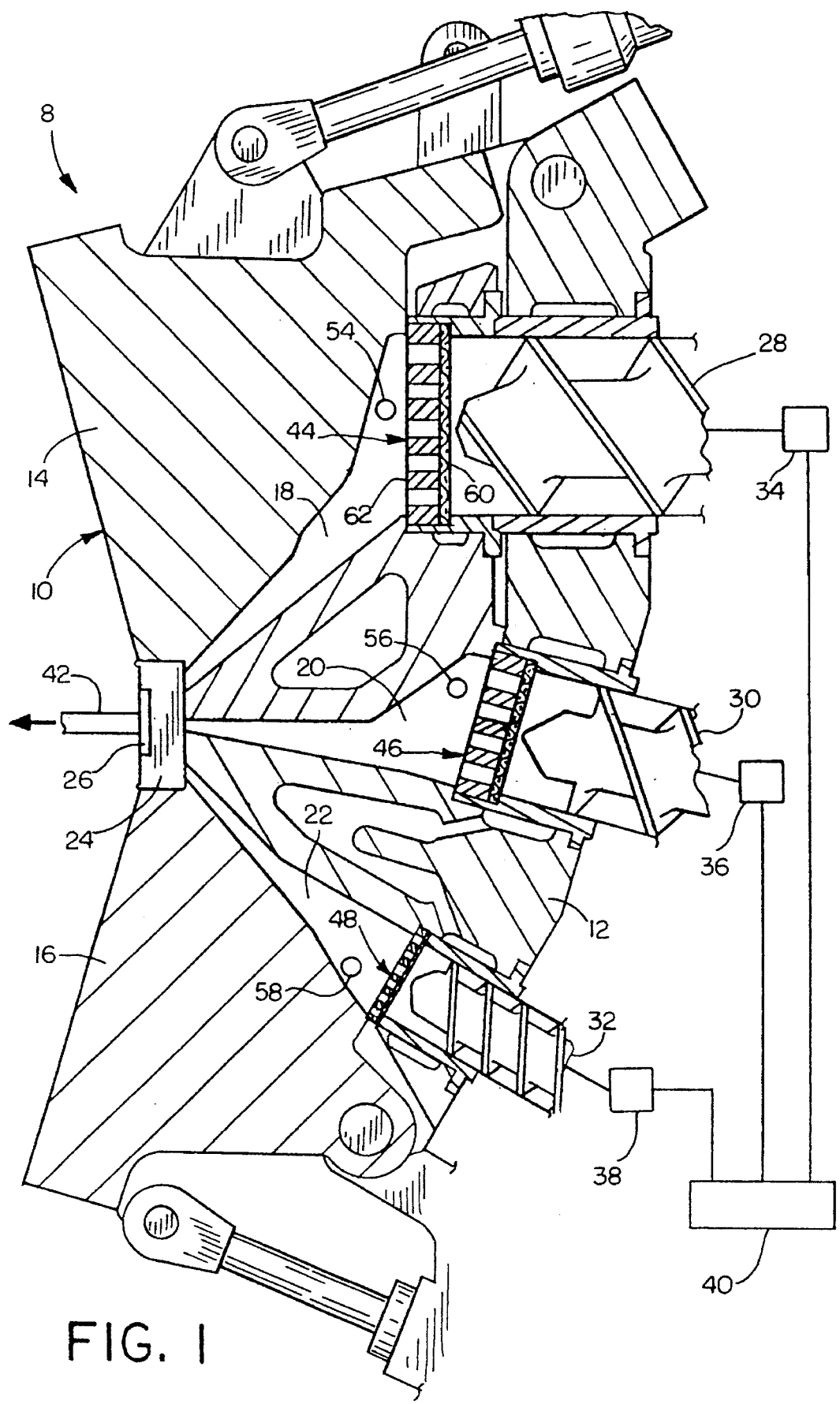
FIG. 1 is a schematic illustration of an extrusion apparatus according to the invention.

In FIG. 1 an extrusion apparatus according to the invention is designated generally by reference numeral 8. The extrusion apparatus comprises a multiple extrusion head 10 including a fixed or stationary central portion or portions 12 and pivotable upper and lower portions 14 and 16. Flow channels 18, 20 and 22 are formed in the head and extend to a cassette 24 and thereafter into an extrusion die plate 26.

The flow channels 18, 20 and 22 are fed by respective extruders 28, 30 and 32 which have respective drive motors 34, 36 and 38. The speed of each drive motor, and hence the feed rate of the respective extruder, is controlled by well known means herein referred to as an extruder speed controller 40. The extruders feed respective components into the flow channels for passage to the cassette and then die wherein the components are brought together to form a composite profiled strip 42.

As thus far described, the extrusion apparatus 8 is of conventional design. In a typical process for producing a tire tread strip composed of three different rubber compounds, the extruders may operate, for example, at 1800 psi, 1200 psi and 900 psi for feeding the rubber compounds which vary in viscosity. Consequently, the rubber compounds, when brought together and discharged from the die, will swell at different rates. Also, a higher pressure rubber compound may swell into a lower pressure rubber compound. In the past, the cassette and die would be designed to compensate for the differing die swells so as to obtain the desired profile of the composite strip after swelling. However, the die design usually would be optimized for a single extrusion rate at which the extrusion apparatus was intended to operate. Accordingly, these prior extrusion systems did not lend themselves to variable extrusion rates as may be desired in various applications.

In accordance with the present invention, flow restriction devices 44, 46 and 48 are disposed in the flow channels 18, 20 and 22 to create a pressure drop between the die and the extruders 28, 30 and 32. The degree of flow restriction is selected to reduce the pressure differential between the components to within about 250 psi and more preferably within about 200 psi prior to their being brought together for passage through the die or, if desired, equalize the pressure. In conjunction therewith, the extruder speed may be varied to optimize system operation. This approximate equalization of pressure minimizes or eliminates one component overpowering another component in the die. As is preferred, the flow restriction devices are removable from the flow channels for cleaning, repair, etc., and further for replacement by other flow restriction devices for adaptation of the apparatus for use with other compounds that may vary in viscosity, feed rates, etc.

The flow restriction devices 44, 46 and 48 also have been found to dampen the effect that speed changes have on the individual profiles of the components of the composite profile strip as well as the overall profile of the strip, and consequently the weight per unit length of the composite profile strip. This arrangement effectively enables variable speed extrusion of the composite profile strip, while also reducing the amount of work required to complete optimization of a cassette and/or extrusion die.

As may be desired, the pressure downstream of each flow restriction device 44, 46, 48 may be monitored by a respective pressure sensor 54, 56, 58. The sensed pressure may be supplied to the extruder speed controller 40, which may form part of or be integrated into an overall extrusion process controller, to increase or decrease the screw speed in response to sensed pressure to maintain the desired pressure downstream of the flow restriction device.

The flow restriction devices 44, 46 and 48, in a preferred embodiment, are each in the form of a screen pack including a screen 60 and/or breaker plate 62. The mesh size of the screen, size of perforations in the breaker plate and/or thickness of the braker plate are selected to reduce the difference in pressure between the components at the point they are brought together. The restriction to flow effected by the flow restriction devices generally will be approximately proportional to the extruder feed pressure, i.e., the higher the pressure the greater the flow restriction in terms of pressure drop across the flow restriction device. As will be appreciated, the flow restriction devices may be identical while the degree of pressure drop will vary with the viscosity of the component.

The above described extrusion apparatus is particularly suited for extruding a three component composite profile tread strip for use in manufacture of a vehicle tire. The extrusion speed may be varied by varying the speed of the extruders, while the flow restriction devices dampen the impact of the speed change while speed adjustments are being made to attain new steady state extruder speeds for maintaining the strip profile at the new speed.

Although the invention has been shown and described with respect to a certain preferred embodiment, equivalent alterations and modifications will no doubt occur to others skilled in the art upon the reading and understanding of this specification. The present invention includes all such equivalent alterations and modifications, and is limited only by the scope of the following claims.

What is claimed is:

1. An extrusion apparatus for producing a composite profile strip, comprising an extrusion head having plural flow channels extending to an extrusion die, at least two extruders for feeding respective components at respective different pressures into said flow channels for passage to said extrusion die, said extrusion die having a common die outlet from which the components are discharged to form the composite profile strip, and respective flow restriction devices disposed in said flow channels between said extruders and said extrusion die, said flow restriction devices being operative to decrease the difference in pressure between the components at the extrusion die to about 250 psi or less prior to the components being brought together.

2. An extrusion apparatus as set forth in claim 1, wherein said flow restriction devices are removably disposed in said flow channels.

3. An extrusion apparatus as set forth in claim 1, further comprising pressure sensors associated with said flow channels which sense the pressures of the components downstream of the flow restriction devices, and a controller which controls the speeds of said extruders in response to outputs of said pressure sensors.

4. An extrusion apparatus as set forth in claim 1, wherein at least one of said flow restriction devices includes a foraminous member.

5. An extrusion apparatus as set forth in claim 4, wherein said foraminous member includes a screen.

6. An extrusion apparatus as set forth in claim 5, wherein said foraminous member includes a perforated plate backing said screen.

7. An extrusion apparatus as set forth in claim 4, wherein said foraminous member includes a perforated plate.

8. An extrusion apparatus as set forth in claim 1, wherein the flow restriction devices are operative to reduce the difference in pressure to about 200 psi or less prior to the components being brought together.

9. A method of extruding a composite profile strip comprising the steps of supplying components at respective different pressures to respective flow channels in an extrusion head for passage to an extrusion die that has a common die outlet from which the components are discharged to form the composite profile strip, and causing the components to flow through respective flow restriction devices prior to passage to the extrusion die for reducing the difference in pressure between the components to about 250 psi or less before being brought together at the extrusion die.

10. A method as set forth in claim 9, including the step of monitoring the pressures of the components downstream of the flow restriction devices, and controlling the speeds of said extruders in response to the sensed pressures.

11. A method as set forth in claim 9, wherein at least one of the flow restriction devices includes a foraminous member.

12. A method as set forth in claim 11, wherein a screen is used as the foraminous member.

13. A method as set forth in claim 12, wherein said foraminous member includes a perforated plate backing said screen.

14. A method as set forth in claim 11, wherein said foraminous member includes a perforated plate.

15. A method as set forth in claim 9, wherein the flow restriction devices reduce the difference in pressure to about 200 psi or less prior to the components being brought together.

16. A method of extruding a composite profile strip at different speeds comprising the steps of using at least two extruders to feed components at respective different pressures to respective flow channels in an extrusion head for passage to an extrusion die that has a common die outlet from which the components are discharged to form the composite profile strip at a first speed, and selecting and positioning flow restriction devices in the flow channels to reduce the difference in pressures of the components to about 250 psi or less prior to passage to the extrusion die.

17. A method as set forth in claim 16, comprising the step of varying the speed of the extruders to change the speed at which the composite profile strip is discharged from the extrusion die, while the respective flow restriction devices in the flow channels function dampen the effect the extruder speed change has on the profile of the composite profile strip.

18. A method as set forth in claim 16, wherein said selecting and positioning step includes selecting a screen mesh size for each flow restriction device to provide a pressure drop greater for the higher pressure feed than the lower pressure feed.

19. A method as set forth in claim 16, wherein the flow restriction devices are selected to reduct the difference in pressure to about 200 psi or less prior to the components being brought together.

* * * * *